E. ROBERTSON.
Potato Digger.
No. 28,197. Patented May 8, 1860.
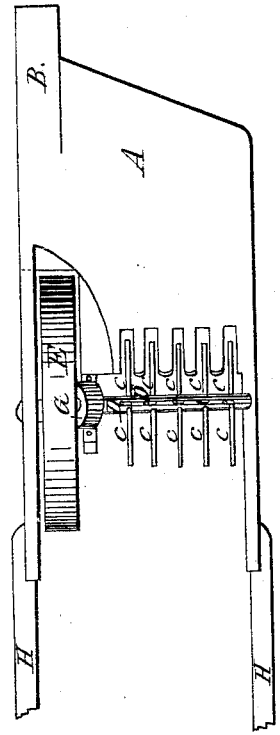
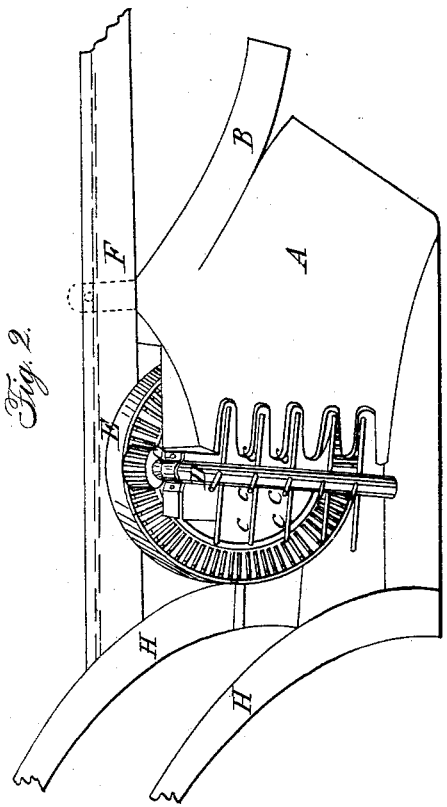
Witnesses:
Inventor:

UNITED STATES PATENT OFFICE.

ELIJAH ROBERTSON, OF HARTFORD, CONNECTICUT.

IMPROVEMENT IN POTATO-DIGGERS.

Specification forming part of Letters Patent No. 28,197, dated May 8, 1860.

*To all whom it may concern:*

Be it known that I, ELIJAH ROBERTSON, of the city of Hartford, county of Hartford, and State of Connecticut, have invented a new and useful Improvement in the Mode of Constructing Potato-Diggers; and I do hereby declare that the following is a correct description thereof, reference being had to the accompanying drawings, and to the letters of reference marked thereon.

The nature of my invention consists in the application and arrangement of a vertical single side wheel actuating a pinion, and rotating crag wheel or shaft, with a series of tangs or fingers to separate the soil and loosen the potatoes from the same after they are plowed up.

To enable others skilled in the art to make and use my invention, I will proceed to describe its construction and operation.

In the drawings, Figure 1 is a plan view of the upper part. Fig. 2 is a side view.

I construct this potato-digger in the manner and form represented in the drawings, Figs. 1 and 2. The mold-board A is single and similar to the usual cutting mold-boards of plows, cultivators, &c. It has a proper share, B, at the front end, and spreads off with a slightly-inclined bevel cutting-edge, either concave or straight, to the mold-board A, as shown in drawings.

At the back part of the mold-board A, I make a series of serrated or deep notches to conform to the number of tangs or fingers C on the crag-wheel D. These notches are so constructed that the fingers C, while rotating, pass through them when operating on the soil after being plowed up by the share and mold-board.

The main driving-wheel E is made of the required diameter, with a broad periphery to travel on the ground, and with flat beveled gear on the inside to correspond and connect and actuate the pinion G of the crag-wheel D, to give the same a proper rotary motion.

The crag-wheel shaft D, I place in an inclined position, as shown in drawings, with the actuating beveled-gear pinion on the top end and the series of tangs or fingers C branching out from the shaft, as shown in drawings, at a suitable distance apart, in accordance to the serrations in the mold-board A.

A proper beam, F, and holding-handles H are attached in the customary manner.

This digger can be worked with one horse, the arrangements being light, strong, and simple. As the plowshare and mold-board plow up the earth with the potatoes the whole mass is carried or moves back over the serrations of the mold-board, and the rotary action of the tangs or fingers C breaks up the earth and loosens the same, and frees and discharges the potatoes in a speedy and complete manner.

The utility of this digger is in the economy and simplicity of construction and lightness of operation.

What I claim as my invention, and desire to secure by Letters Patent, is—

The application and arrangement of the inclined crag or finger wheel D for the purpose herein specified, in combination with the share B, the serrated mold-board A, the vertical side driving-wheel, E, and pinion G, in the manner and for the purpose substantially as herein set forth and described.

ELIJAH ROBERTSON.

Witnesses:
WM. VINE,
S. N. CASE.